United States Patent [19]

DeMaster

[11] 4,035,059

[45] July 12, 1977

[54] LOW-PROFILE RAISED RETROREFLECTIVE PAVEMENT MARKER

[75] Inventor: Robert D. DeMaster, Afton, Minn.

[73] Assignee: Minnesota Mining and Manufacturing Company, St. Paul, Minn.

[21] Appl. No.: 586,578

[22] Filed: June 13, 1975

[51] Int. Cl.² .......................................... G02B 5/13
[52] U.S. Cl. .............................. 350/105; 350/97; 404/6; 404/9
[58] Field of Search .................. 350/105, 104, 103; 404/12, 14

[56] References Cited

U.S. PATENT DOCUMENTS

| | | | |
|---|---|---|---|
| 3,413,058 | 11/1968 | Tung et al. | 350/105 |
| 3,584,932 | 6/1971 | Terril | 350/105 |
| 3,587,415 | 6/1971 | Ergenmann | 350/105 |
| 3,785,719 | 1/1974 | Jonnes | 350/105 |

Primary Examiner—John K. Corbin
Assistant Examiner—B. W. de los Reyes
Attorney, Agent, or Firm—Cruzan Alexander; Donald M. Sell; Roger R. Tamte

[57] ABSTRACT

A low-profile raised retroreflective pavement marker that resists loosening and removal from a paved surface comprises a flat dead-soft base sheet and at least one elastically deformable retroreflector attached to one face of the base sheet so as to extend above the base sheet no more than about one centimeter.

8 Claims, 2 Drawing Figures

LOW-PROFILE RAISED RETROREFLECTIVE PAVEMENT MARKER

BACKGROUND OF THE INVENTION

The pavement marking industry has long been seeking improved types of raised retroreflective pavement markers. Raised markers, in contrast to other pavement markings such as painted lines, extend above the pavement so as to be visible and reflective even when the pavement is wet.

To be fully satisfactory, a raised retroreflective pavement marker should be applicable at low cost, should have a reasonably long useful life (which infers that it will maintain reflectivity, exhibit long adhesion to the roadway, and maintain physical integrity); should be nonhazardous if dislodged from the pavement surface; and should ideally remain on the pavement during snow-plowing. Despite a long period of effort on raised retroreflective pavement markers, and a measure of commercial success for some of them, no existing pavement marker has ever provided the desired combination of properties.

SUMMARY OF THE INVENTION

The present invention provides a new structure for a raised retroreflective pavement marker which has a surprising combination of advantageous properties. Briefly, the new pavement marker comprises a flat dead-soft base sheet and at least one elastically deformable retroreflector attached to one face of the base sheet so as to extend above the base sheet no more than about one centimeter. Because of its low height, the pavement marker can be called a "low-profile" marker. The retroreflector is preferably in the form of a narrow elongated strip and comprises an elastically deformable main body portion and an elastically deformable retroreflective structure united to the main body portion so as to form the exterior surface of at least portions of the retroreflector. Preferably the retroreflective structure comprises a dense monolayer of glass microspheres partially embedded in, and partially exposed above, an elastomeric support sheet which is adhered to the main body portion, with specular reflective means underlying and in optical communication with the microspheres.

This low-profile raised pavement marker can be attached to a paved surface with a layer of adhesive between the bottom of the base sheet and the paved surface. Such an operation is conveniently and rapidly performed to provide a brightly retroreflective pavement marking, which can be made to: retroreflect under either dry or wet conditions, or both, as desired; adhere to the roadway and provide a useful reflection for extended periods of time; offer improved resistance to snow-plowing; and be a minimal hazard if loosened from a roadway surface.

PRIOR ART

Several prior-art teachings have elements of similarity with, but do not teach or lead to, the new pavement marker of the invention.

For example, metal sheets were suggested for use in pavement markings by Stephens, U.S. Pat. No. 1,966,318; but these metal sheets were to be used in long continuous flat strips as center lines and did not carry any elastically deformable retroreflective structure. Rideout, U.S. Pat. No. 3,418,896 teaches pavement markers for drop-on application onto a tacky painted line. While these pavement markers can be rather low in height, they are not elastically deformable and they are not adhered to a dead-soft base sheet. Finch, U.S. Pat. No. 3,836,275, shows a tape product which can include low-profile retroreflector units inserted into an opening in the tape. However, there is no showing of an elastically deformable retroreflective structure, nor are the retroreflective units adhered to a dead-soft base sheet. And Jonnes, U.S. Pat. No. 3,785,719 teaches pavement markers having elastomeric reflector portions, but it does not teach the low-profile pavement marker of the invention in which an elastically deformable retroreflector is adhered to a dead-soft base sheet.

All in all, pavement markers of the present invention are a unique combination of structural elements, and achieve results never before achieved by any known prior pavement marker.

DETAILED DESCRIPTION

Figure 1:
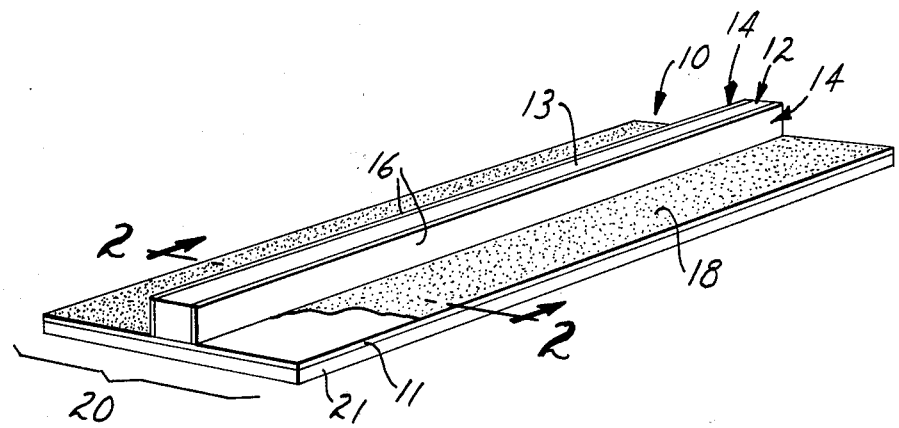
FIG. 1 is a perspective view of an illustrative low-profile raised retroreflective pavement marker of the invention.

The illustrative pavement marker 10 of the invention shown in FIG. 1 comprises a base sheet 11 and a narrow elongated retroreflective strip 12 adhered to the base sheet. The base sheet 11 is a dead-soft material such as dead-soft aluminum, which means that the base sheet will easily deform (as by finger pressure) and will retain the deformed shape. It has been found that when such a dead-soft material is adhered to a roadway with adhesive, it remains adhered for long periods of time. Apparently the lack of resilience in such a material prevents or relieves stresses that might otherwise loosen the sheet upon passage of traffic.

The retroreflective strip 12 in the illustrative pavement marker 10 shown in FIG. 1 comprises a main body portion 13 and an elastically deformable retroreflective structure 14 adhered to one or both sides of the main body portion. The main body portion 13 is elastically deformable (which means that it can be compressed at room temperature at least 50 percent of its original height, and, when momentarily compressed 50 percent and then released, will recover at least 80 percent of its original height). An especially useful elastically deformable retroreflective structure 14, illustrated best in FIG. 2, comprises an elastomeric support layer 15 and a dense monolayer of transparent microspheres 16 partially embedded in, and partially exposed above, the support layer. Such an elastically deformable retroreflective structure can be conveniently made by processes as described in Palmquist et al, U.S. Pat. Nos. 3,382,908 and 3,449,201.

Figure 2:
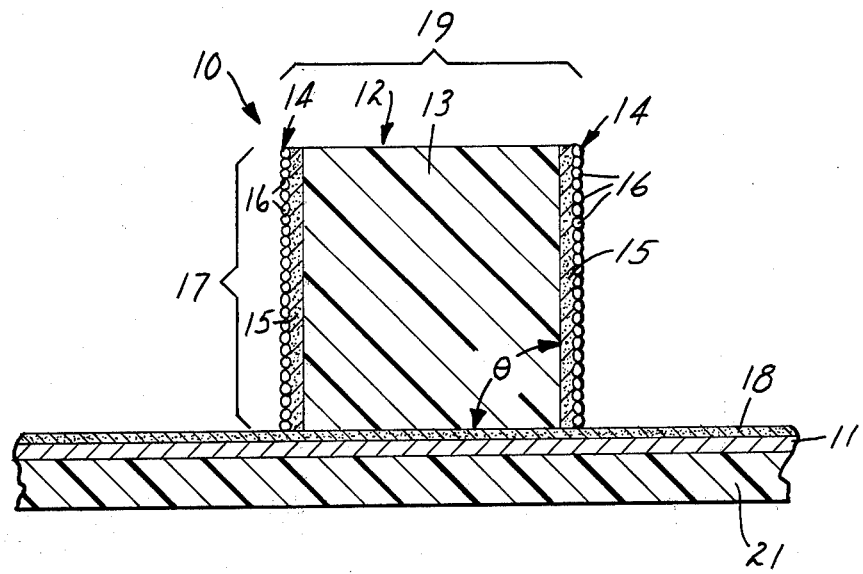
FIG. 2 is an enlarged cross-section through a portion of the pavement marker illustrated in FIG. 1.

The illustrated retroreflective strip 12 is conveniently made by laminating an elastically deformable retroreflective sheeting to one or both faces of a tape of elastically deformable material, and then cutting the resulting web into widths equal to the height 17 shown in FIG. 2. Adhesion between the main body portion and retroreflective sheeting may be developed by coating an adhesive on one or both of them; or, the main body portion and elastomeric support layer may be laminated together under heat and pressure which bonds or vulcanizes them together.

The retroreflective strip 12 is conveniently adhered to the base sheet by coating a thin layer of adhesive material onto the face of the base sheet 11 (such as the layer 18 shown in section in FIG. 2 and by stippling in FIG. 1) and then pressing the retroreflective strip against the base sheet. Adhesion may also be obtained with an adhesive coated on the bottom of the retroreflective strip. Under the pressure developed in the adhering operation, the strip may be deformed, so as to increase the width at the base of the strip and thereby increase the area of contact between the strip and base sheet.

To increase resistance to snow-plowing and to otherwise improve its durability, the pavement marker has a low profile. Preferably the retroreflective strip has a height 17 of less than about one centimeter, more preferably less than about one-half centimeter, and even more preferably about 2 or 3 millimeters or less. It has been found that such a low profile retroreflector will offer a very substantial retroreflectivity at night, especially when applied as a series along the length of a roadway at intervals of, for example, one-half meter to 5 meters. When observed under headlight illumination at night from 30 to 50 meters, such a series can have the appearance of a continuous bright line, which is useful to delineate or indicate the edge or separate lanes of a highway.

The dimensions of the base sheet 11 will vary depending on the height of the pavement marker and the method of application of the marker to a roadway. Usually the base sheet will be about 1–5 centimeters wide and 5–20 centimeters long. The thickness may also vary but will generally be on the order of 25–100 micrometers.

The width 19 of the retroreflective strip is preferably substantially less than the width 20 of the base sheet (see FIG. 1) to avoid introducing the resilience of the retroreflective portion over the whole width of the base sheet, which, depending on the thickness of the base sheet, could at least partially negate the dead-soft properties of the base sheet. Preferably the retroreflective strip is less than about one centimeter, and more preferably less than one-half centimeter, in width.

With the retroreflective strip in place on the base sheet, the retroreflective structure need not be perpendicular to the base sheet but generally will form an approximate angle with the base sheet (the angle theta ($\theta$) in FIG. 2) of at least 20° and more preferably at least 45°. Also the exterior surface of the retroreflective structure need not be planar. Instead of retroreflectors in strip form other elastically deformable structures can be used, such as flat-bottom, curved-top buttons (having the shape of the edge-portion of a sphere, for example). But an elongated strip provides a desired amount of reflection and can be made conveniently.

The retroreflective structure in a pavement marker of the invention most commonly comprises glass microspheres with specular reflective means underlying and in optical connection with the back surfaces of the microspheres. Such specular reflective means is typically a coating of a metal such as aluminum vapor-deposited onto the microspheres before they are partially embedded into a support sheet. To obtain maximum retroreflection when a pavement marker is dry, the microspheres in a construction as described should have an index of refraction of 1.91; to obtain maximum retroreflection when the pavement marker is wet, the index of refraction should be about 2.5; and to obtain retroreflection under both wet and dry conditions, a mixture of microspheres having different indices of refraction may be used, either by mixing them on the same pavement marker or by alternating pavement markers that are all of the same index of refraction in a series along a roadway.

A pavement marker of the invention may carry a layer (21 in FIGS. 1 and 2) of adhesive such as a mastic adhesive on its bottom surface; or adhesive may be applied to a roadway or to the marker at the time of application of the marker to a roadway.

In one illustrative example, a pavement marker of the invention comprised an aluminum dead-soft base sheet about 2.5 centimeters wide and 10 centimeters long. The retroreflective strip was 2 millimeters wide, 2 millimeters high, and 10 centimeters long. The retroreflective strip consisted of a main body portion, which comprised ground scrap rubber particles dispersed in a chlorinated polyethylene binder material, and an elastomeric retroreflective sheeting as described in Palmquist et al, U.S. Pat. No. 3,449,201 bonded to the main body portion. The retroreflective strip was adhered to the base sheet by coating a heat-activatable plasticized mixture of polyvinyl chloride and chlorinated polyethylene polymers onto the bottom of the strip, and then pressing the strip against the base sheet in the presence of heat. A 0.2-millimeter-thick layer of mastic adhesive based on polybutadiene rubber was adhered to the bottom of the base sheet.

What is claimed is:

1. A low-profile raised retroreflective pavement marker that resists loosening and removal from a paved surface, comprising a flat dead-soft metal base sheet and a narrow elongated retroreflective strip adhered to one face of the base sheet; said strip being less than about one centimeter high, less than the base sheet in width, and comprised of an elastically deformable main body portion and an elastically deformable retroreflective structure that is united to the main body portion so as to form the exterior surface of at least portions of the strip, said exterior surface portions being at an angle of at least 20° to the base sheet.

2. A pavement marker of claim 1 in which said retroreflective structure comprises a dense monolayer of transparent microspheres partially embedded in, and partially exposed above, an elastically deformable support sheet which is adhered to the main body portion.

3. A pavement marker of claim 1 in which said retroreflective strip is less than about 3 millimeters in height.

4. A pavement marker of claim 1 in which said main body portion comprises ground rubber particles dispersed in a matrix of binder material.

5. A pavement marker of claim 1 in which the retroreflective strip is less than one-half centimeter in width.

6. A low-profile raised retroreflective pavement marker that resists loosening and removal from a paved surface, comprising a flat dead-soft metal base sheet and at least one elastically deformable retroreflector that is attached to one face of the base sheet, is smaller in area than the base sheet, extends above the base sheet no more than about one centimeter so as to provide exterior surfaces that are at an angle of at least 20° to the base sheet, and carries on said exterior surfaces a dense monolayer of retroreflective microspheres partially embedded in, and partially exposed out of the exterior surfaces.

7. A pavement marker of claim 6 in which said retroreflector is a narrow elongated strip less than about 1 centimeter wide.

8. A pavement marker of claim 6 in which said retroreflector comprises an elastically deformable main body portion and an elastically deformable retroreflective structure, said retroreflective structure comprising an elastically deformable support sheet which is adhered to the main body portion and in which the dense monolayer of transparent microspheres is partially embedded.

* * * * *